(12) United States Patent
Weber et al.

(10) Patent No.: US 10,479,333 B2
(45) Date of Patent: Nov. 19, 2019

(54) METHOD AND APPARATUS FOR NAVIGATION ACCOMMODATING TRAIN CROSSINGS

(71) Applicant: FORD GLOBAL TECHNOLOGIES, LLC, Dearborn, MI (US)

(72) Inventors: David Charles Weber, Toledo, OH (US); Perry Robinson MacNeille, Lathrup Village, MI (US); Yimin Liu, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 61 days.

(21) Appl. No.: 15/817,725

(22) Filed: Nov. 20, 2017

(65) Prior Publication Data
US 2019/0152450 A1    May 23, 2019

(51) Int. Cl.
| B60T 7/22 | (2006.01) |
| G01C 21/34 | (2006.01) |
| G05D 1/00 | (2006.01) |
| B60Q 9/00 | (2006.01) |
| G08G 1/16 | (2006.01) |
| B60T 7/18 | (2006.01) |
| G01S 17/00 | (2006.01) |
| G01S 15/00 | (2006.01) |

(52) U.S. Cl.
CPC ............. *B60T 7/22* (2013.01); *B60Q 9/00* (2013.01); *B60T 7/18* (2013.01); *G01C 21/3415* (2013.01); *G01C 21/3461* (2013.01); *G01S 15/00* (2013.01); *G01S 17/00* (2013.01); *G05D 1/0061* (2013.01); *G08G 1/166* (2013.01); *B60T 2201/022* (2013.01); *B60T 2210/36* (2013.01); *G05D 2201/0213* (2013.01)

(58) Field of Classification Search
None
See application file for complete search history.

(56) References Cited

U.S. PATENT DOCUMENTS

| 6,751,549 B1* | 6/2004 | Kozak .................. B61L 29/246 701/410 |
| 8,838,301 B2 | 9/2014 | Makkinejad |
| 9,227,642 B2 | 1/2016 | Huntimer et al. |
| 2014/0346284 A1* | 11/2014 | Fries ...................... B61L 13/00 246/125 |
| 2017/0155875 A1 | 6/2017 | Shubs, Jr. et al. |
| 2017/0314943 A1* | 11/2017 | Fujita ..................... G01C 21/34 |

* cited by examiner

*Primary Examiner* — Thomas G Black
*Assistant Examiner* — Demetra R Smith-Stewart
(74) *Attorney, Agent, or Firm* — Michael Spenner; Brooks Kushman P.C.

(57) ABSTRACT

A system includes a processor configured to access a train schedule to determine active train crossings along an original route, based on a predicted vehicle-arrival time at a given crossing. The processor is also configured to determine that a driver identity has an avoidance parameter associated therewith and determine a new route avoiding active train crossings, if possible, responsive to the avoidance parameter and determination of at least one active train crossing along the original route.

12 Claims, 8 Drawing Sheets

METHOD AND APPARATUS FOR NAVIGATION ACCOMMODATING TRAIN CROSSINGS

TECHNICAL FIELD

The illustrative embodiments generally relate to methods and apparatuses for navigation accommodating train crossings.

BACKGROUND

Enhanced navigation systems provide levels of driving ease and understandability that were unheard of decades ago. Drivers can see traffic, construction and even weather patterns related to a navigation route and make driving decisions to accommodate or avoid slow or unsafe areas. Even with the advancements to navigation, however, opportunities for improvement still exist.

One point of concern related to travel finds root in the prevalence of accidents and fatalities involving train crossings. Hundreds of train+vehicle related fatalities occur in the US every year and thousands of accidents occur. Whether this is due to a lack of crossing guards, people making poor decisions resulting in a vehicle stopped on train tracks, or a general lack of understanding about how long it takes to stop a train weighing millions of pounds, drivers could avoid almost all of these accidents with a little foresight. Additionally, drivers may not know how much traffic a passing train will cause, resulting in unexpected and unpredictable delays.

Primary causes of accidents at crossings, according to the Federal Railroad Administration, include:

1) Detecting the crossing, high visual demand (or distraction) may cause drivers to miss traffic control devices and the crossing itself;

2) Driver behavior at the crossing—Drivers become impatient waiting for the train to arrive and drive through the intersection, drivers ignore safety rules (especially when they are familiar with the intersection), or drivers fail to comply with warning devices;

3) Perception errors at the crossing, including: recognizing the train (80% of accidents), particularly when sight distance is limited and at passive crossings with no lights or gates (e.g. at dual track crossings, the view of one train blocks the view of another train on a different track, warning systems that are perceived to be faulty due to stalled trains, construction, etc and so are ignored).

4) Decision-making in the dilemma zone where misjudgment can lead to a train-road vehicle collision, speed variance and inconsistency on the part of drivers can lead to rear-end collisions; or when trains cross the road in opposite directions and a driver may need heed the warning lights or barriers if he thinks the first train has passed, not realizing there is a second train coming from the other direction; and 5) Spillback where vehicles can be trapped on a crossing, blocked by other vehicles from moving out of the train's path by vehicles ahead and behind.

SUMMARY

In a first illustrative embodiment, a system includes a processor configured to access a train schedule to determine active train crossings along an original route, based on a predicted vehicle-arrival time at a given crossing. The processor is also configured to determine that a driver identity has an avoidance parameter associated therewith and determine a new route avoiding active train crossings, if possible, responsive to the avoidance parameter and determination of at least one active train crossing along the original route.

In a second illustrative embodiment, a system includes a processor configured to determine that a current travel path includes an active train crossing based on expected train presence time. The processor is also configured to determine that a vehicle is within a braking threshold distance from the active train crossing and automatically brake the vehicle, preventing forward movement of the vehicle until a train has cleared the train crossing, responsive to the vehicle being within the braking threshold distance.

In a third illustrative embodiment a computer-implemented method includes determining, via a vehicle computer or a remote computer in communication with the vehicle computer, that a vehicle is within a threshold distance of an active train crossing, where a train is projected to arrive no later than a threshold time from a present time. The method also includes preventing the vehicle from entering a region defining a likely-impact region, responsive to the determining that the vehicle is within the threshold distance, until the vehicle computer determines that the train has cleared the crossing.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
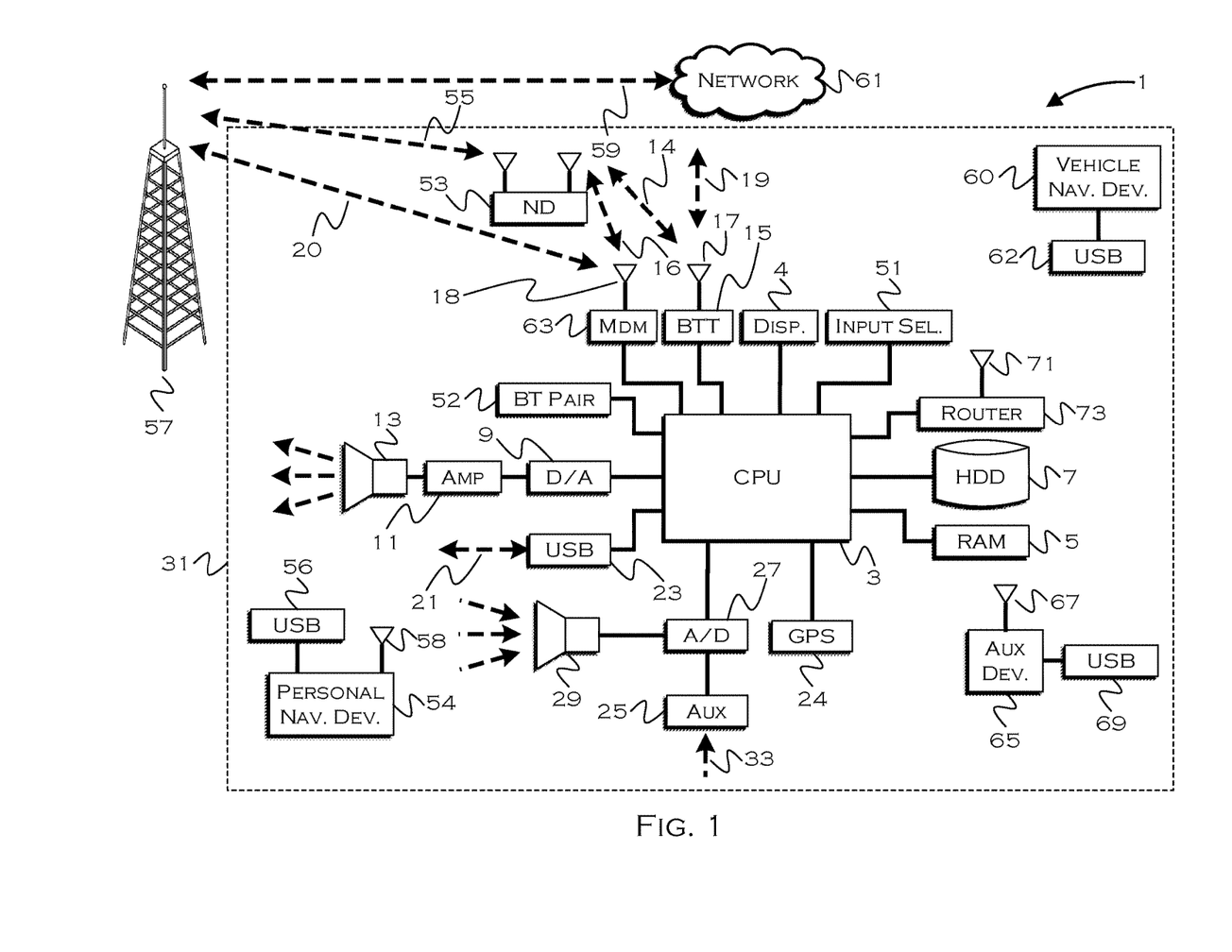
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 802.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The number of vehicle and train collisions in the US remained around two thousand annually for the time period spanning 2013-2015, and the number of fatalities remained around the mid two-hundreds. While some accidents due to vehicles becoming stuck or breaking down in a horrible location (i.e., on the tracks as a train is approaching) may have been unavoidable, certain of these accidents could have been prevented with a modicum of foresight. And, while it may not always be possible, completely avoiding routes that cross over train tracks is a foolproof way to ensure that a vehicle and train collision never occurs. Avoiding crossings when a train is predicted to be at the crossing is also a good way to save time in travel.

The illustrative embodiments propose a number of navigation and control related aspects of solutions to solving collision problems related to trains. Through application of the illustrative embodiments and the like, the incidents of train and vehicle collisions could be greatly mitigated.

Figure 2:
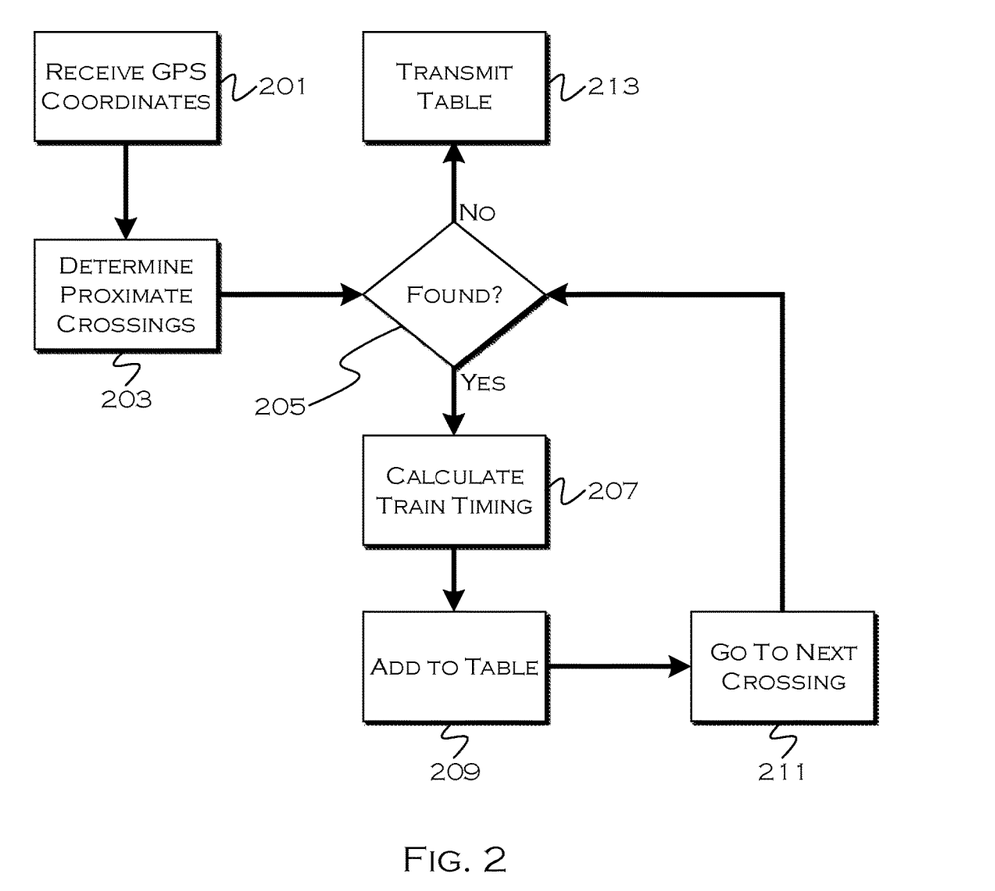
FIG. 2 shows an illustrative process for route/crossing recordation.

FIG. 2 shows an illustrative process for route/crossing recordation. In this example, the process builds a lookup table of all train crossings within a predefined radius (or other region) of a vehicle or GPS location the table including at least a projected start of train crossing time and an end of train crossing time. This provides a quick and simple reference for determining if a route or vehicle will intersect a train crossing, and whether a train will likely also be located at the crossing when the vehicle arrives. While the start of the train crossing may be typically the most critical, it is not necessarily the sole consideration, since in low visibility (e.g. fog, nighttime), there is still a safety risk in running into the middle or end of a train. The table can be assembled by the vehicle or a central server, and a central server can also serve out relevant information to vehicles each time a projected train scheduled event changes (based on real-time occurrences or expectations).

The central server can track the start times, end times and GPS coordinates of every crossing, and can send relevant (e.g., based on a vehicle's current location) data to a given vehicle. Any time the start or end time data changes, this data can be re-distributed to the vehicles in a relevant area around the crossing for which the data changed.

In this example, the process receives 201 GPS coordinates, which could include current vehicle coordinates or coordinates at a location along a route. The process then searches 203 within a predefined area (which could be distance or time based) around the coordinates. A time-based area includes, for example, all locations reachable by a vehicle traveling at posted speeds within N time (e.g., 10 minutes from that location). This may or may not also accommodate weather and traffic considerations. The particular choice for area parameters is not paramount, the general goal is to achieve an understanding of when and where trains will be arriving proximate to a vehicle located at the GPS coordinates.

For each 205 train crossing the process finds within the area considered, the process calculates 207 the timing of one or more trains (e.g., arrival, clearing time, etc.). The arrival times could be calculated within, for example, a predetermined threshold (10 mins, 1 hour, 1 day, etc.) of a current time or, for example, a future time when a vehicle is expected at the GPS coordinates. For each incident of crossing within the time window, the process adds 209 the crossing to a table, which may also indicate how long the duration of the crossing is expected to be and the updated estimated time of arrival to driver's destination. The process then proceeds 211 to a next-crossing.

The reference table can be used for a number of determinations in future considerations, not the least of which is simply knowing based on route or even simply speed and heading, whether a vehicle path will intersect the path of a crossing including a train. The table returned can have a time-extended snapshot, so each crossing may have multiple trains arriving and crossing within a predefined or dynamic time window. Train data can be updated if any changes are observed, and/or as a vehicle moves. For example, each crossing in a 10 mile radius for 1 hour might be considered, which is to say that if crossing A had 3 trains crossing in the next hour, the data for that crossing might include 3 rows in the table, each identifying a train arrival and passing (clearing) time. As the vehicle travels (every few miles, or minutes, and/or whenever already reported data changes), the process can request data in a new 10 mile radius (10 miles being illustratively demonstrated for example only). This keeps the vehicle with updated data and allows the vehicle to drop data for crossing which have already been passed, if desired.

Figure 3:
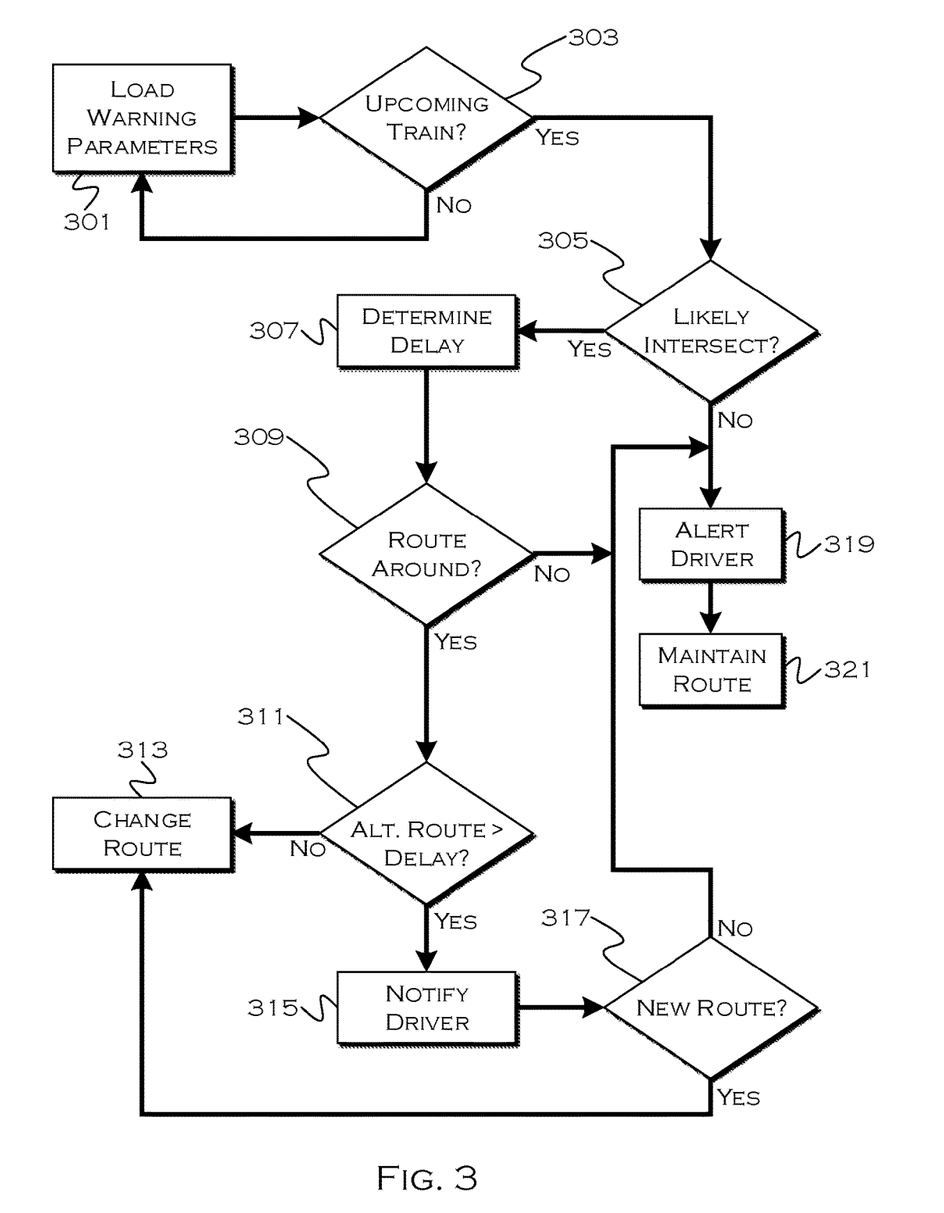
FIG. 3 shows an illustrative process for train avoidance.

FIG. 3 shows an illustrative process for train avoidance. In this example, the process considers options for routing around active crossings (or even crossings entirely). An active crossing is a crossing that will include a train when or close to when a vehicle arrives at the crossing.

In this example, the process loads 301 a set of warning parameters. These parameters may be OEM specified or can be tuned and adjusted by individual users. For example, the parameters may specify an alert if a vehicle is within X distance or Y time of intersecting a train (based on route or heading/speed). If there is an "upcoming" train 303 (that is, a train will likely be present within the warning parameter consideration), the process then determines if the current route or speed/heading is likely 305 to cause an actual intersection with the train. That is, if a train is present or expected within X distance or Y parameters, there is still a chance in many cases that the vehicle will not actually encounter the train unless the driver speeds up, slows down, etc. So a likely intersection would be a case where traveling based on travelable speed (accommodating traffic) or posted speeds will likely cause the vehicle and train to be at the crossing simultaneously.

If there is no likely intersection, the process may alert 319 the driver of the existence of the train, but that, for example, maintaining posted speeds should not cause the driver to encounter the train. The process may then maintain 321 the present route.

If there is a likely intersection of vehicle and train, the process may determine 307 a delay associated with encountering the train. This delay could include traffic related delays and/or a simple calculation of when a train is expected to clear a crossing. If the driver has chosen to route around 309 the active crossings, the process may determine one or more alternate routes that avoids intersecting the train. In some cases, the driver may only automatically attempt route arounds for delays greater than a certain time threshold. In some instances at least, the delay may be limited because the train will be mostly clear by the time the driver arrives, and in those cases, it may make sense to maintain a route intersecting the crossing, due to the time delay from a possible route-around.

In this example, the process compares 311 the extra travel associated with an alternate route to the expected delay time, to determine which is more impactful on the driver. If fuel was a concern to the driver, this process could also consider fuel usage, which is likely to be far less simply sitting at a crossing than taking an alternate route.

If the delay associated with the alternate route is expected to be less than the delay of waiting for the train, then in this example the process changes 313 the route automatically. The new route will allow the driver to reach the destination sooner, so unless fuel is a factor, this route is likely a better route. If the delay is shorter than the route, then, in this example, the process asks 315 the driver if the longer route is preferred. Some drivers prefer to continue moving as opposed to waiting, so certain drivers may prefer the alternate route, even if the total amount of travel time increases. If the driver elects 317 the new route, then the process uses 313 the alternate route, despite the increased total travel time. Otherwise, the process maintains the route.

Figure 4:
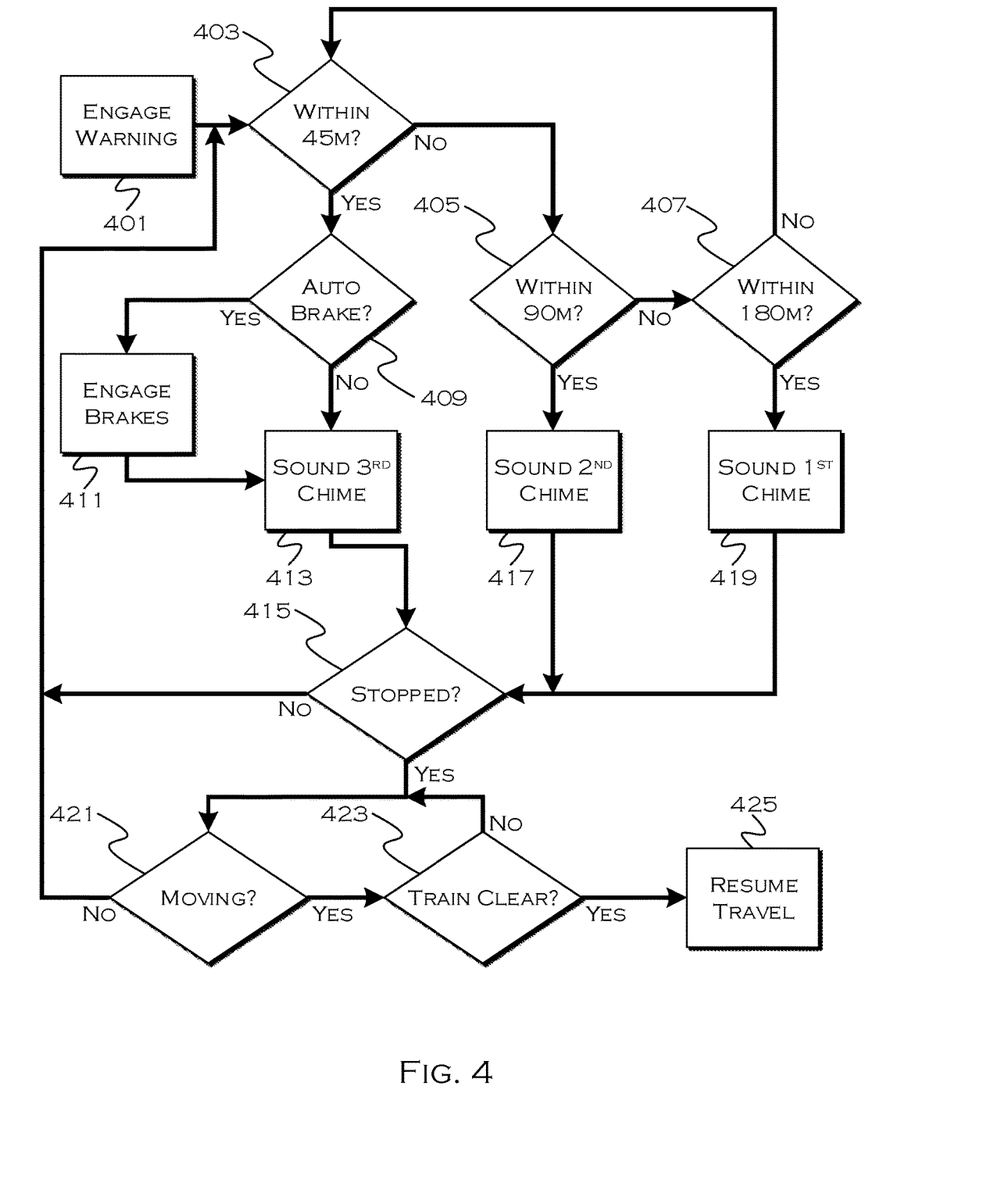
FIG. 4 shows an illustrative process for automatic vehicle control.

FIG. 4 shows an illustrative process for automatic vehicle control. In this example, the process engages 401 a warning and control system when the vehicle is within a certain predetermined distance of a crossing. In this example, the process engages when the vehicle is approaching an active or soon-to-be active crossing, but any reasonable time for engaging the process is contemplated.

In this example, if the vehicle is within 45 meters (an illustrative value only) of the train crossing, the process determines 403 if the driver or OEM has engaged auto-braking 409. Auto-braking is a safety feature that will, in this example, actually stop the vehicle and not allow the vehicle to proceed until the process determines that travel is safe. If there is no and/or no likelihood of intervening traffic between the vehicle and the crossing, the auto-braking threshold 409 could be lowered to prevent the vehicle from stopping too far from the crossing.

If auto-braking is engaged and the vehicle is within the threshold distance for braking (in this example, 45 meters), the process engages 411 vehicle brakes. Whether or not auto-braking is engaged, the process will sound/show 413 a high alert status, designed to clearly let the driver know they are approaching an active or soon-active crossing. This could include, for example, vivid displays and/or loud warning tones, alerts. The alerts 413,417 and 419 may be stopped after a time, if the vehicle is not moving 421. In subsequent usage, a "chime" or "alert" can be any alert or warning to the driver (e.g. instrument panel lights, verbal warning thru the navigation voice, steering wheel or seat vibrations, turning off the sound system, etc.) and the intensity of each chime can be adjusted in various ways to inform the driver of the level of potential risk.

If the vehicle is not within the high risk threshold, but is within a medium risk threshold 405 distance (in this example, 90 meters), the process may sound 417 a lower priority alert, which could still include visual, vibration and audible components, but at a lower brightness, amplitude, frequency, size, color or sound level than the high alert. Here the process does not yet engage automatic braking, as the vehicle is still some distance from the crossing. Finally, in this example, the process determines if the vehicle is within a first lowest threshold 407, the occurrence of which can cause the vehicle to sound 419 a lowest level chime or display a lowest level alert. The number of alert tiers is not critical, and the alert could even persist at rising brightness/volume up until the vehicle stops (i.e., the brightness or volume increases inversely to distance from the crossing).

At any point, if the vehicle stops moving 415, the process ensures the vehicle has not begun moving again 421 before the train has cleared the crossing 423. As long as the vehicle remains stopped and the train is still in the crossing (or not clear of the crossing if it has not yet arrived), the process will continue to check for movement and continue the alert process based on movement. Once the train is clear, the alert process ends and the vehicle can resume 425 travel.

Figure 5:
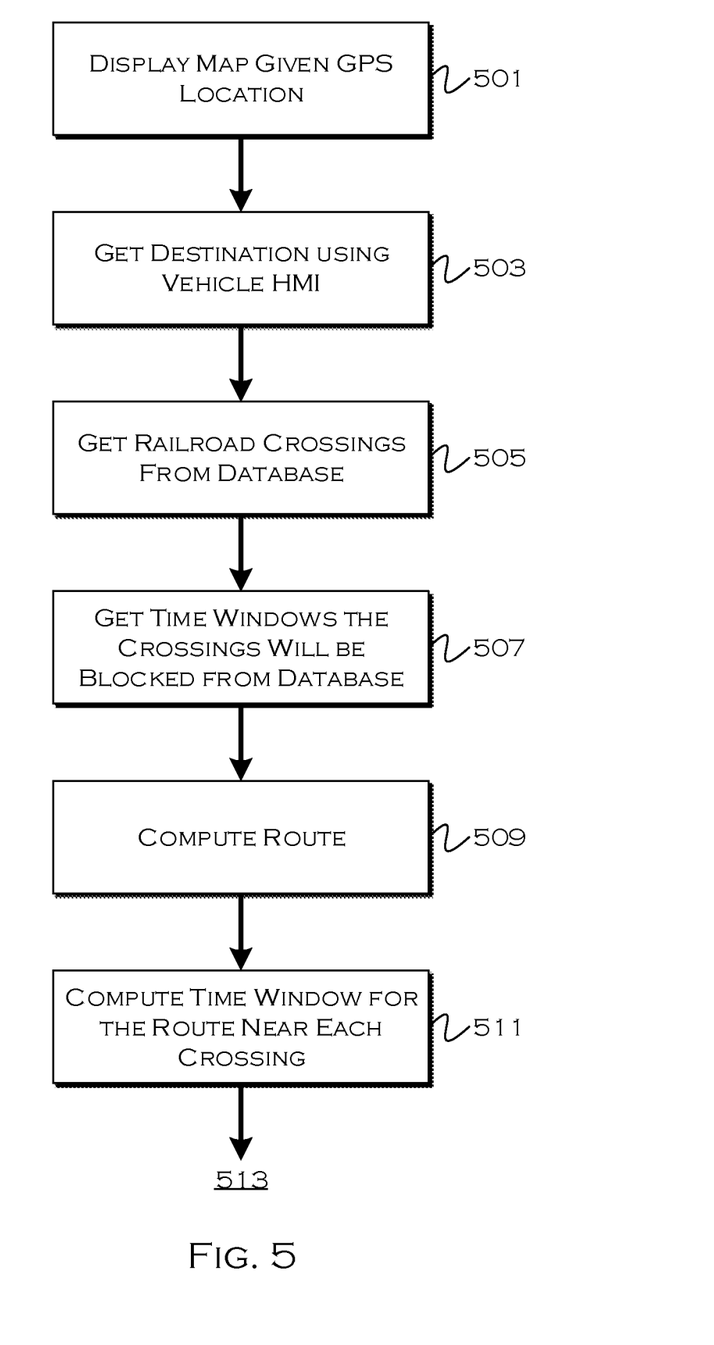
FIG. 5 shows an illustrative route-around process.

FIG. 5 shows an illustrative route-around process. This example is another illustrative process for routing-around a train crossing. The process displays 501 a map with current vehicle GPS coordinates included thereon (typically as a displayed vehicle at the coordinates). The process retrieves 503 the destination and determines 505 any crossings either intersecting the route and/or within a threshold distance from the route. If the process only considers the actual route, the process may repeat if the user deviates from the route, effectively resulting in a new route to the destination.

Based on the identified train crossings along the route, the process then determines 507 which crossings will be active when a vehicle is expected to arrive, or during the journey, or within a time threshold of an expected arrival. The process then computes a route 509 and an estimated time window 511 for when a vehicle is expected to be near a particular crossing along the route.

The process then displays a map 513 to the destination, a route 515 to the destination and any active railway crossings 517 along the route. Again, active railway crossings are those intersected during or proximate to train arrival. By knowing an approximate arrival time of the vehicle, the process can know whether or not a particular crossing should be classified as active for consideration purposes.

If there are no active crossings 519, the process can begin route guidance. If there are any projected active crossings, the process can remove 521 the active crossings, treating those segments of road as untravellable and calculate a new route that does not cross the active crossings. In some instances, this may be a practical impossibility (e.g., the vehicle might have to go 20 miles out of the way on a 5 mile journey to avoid an active crossing), so in those instances the routing process could either recommend a new departure time or tell the user there is an unavoidable delay associated with the active crossing. Additionally or alternative, the process could recommend a stop for an expected duration of the delay, based on context, for example (e.g., recommend a lunch stop if the train is unavoidable and the timing corresponds to lunch time). While the routing engine could conceivably simply send a vehicle in circles until a crossing cleared, most users would probably prefer to either simply depart later or wait.

The user selects 523 a new route (or new departure time) from the available options and the process begins 525 route guidance using the newly selected route. This could also include, for example, selecting an option to "wait" if no suitable alternative route is available and the user does not want to wait to depart (due to local traffic or other considerations).

Figure 6:
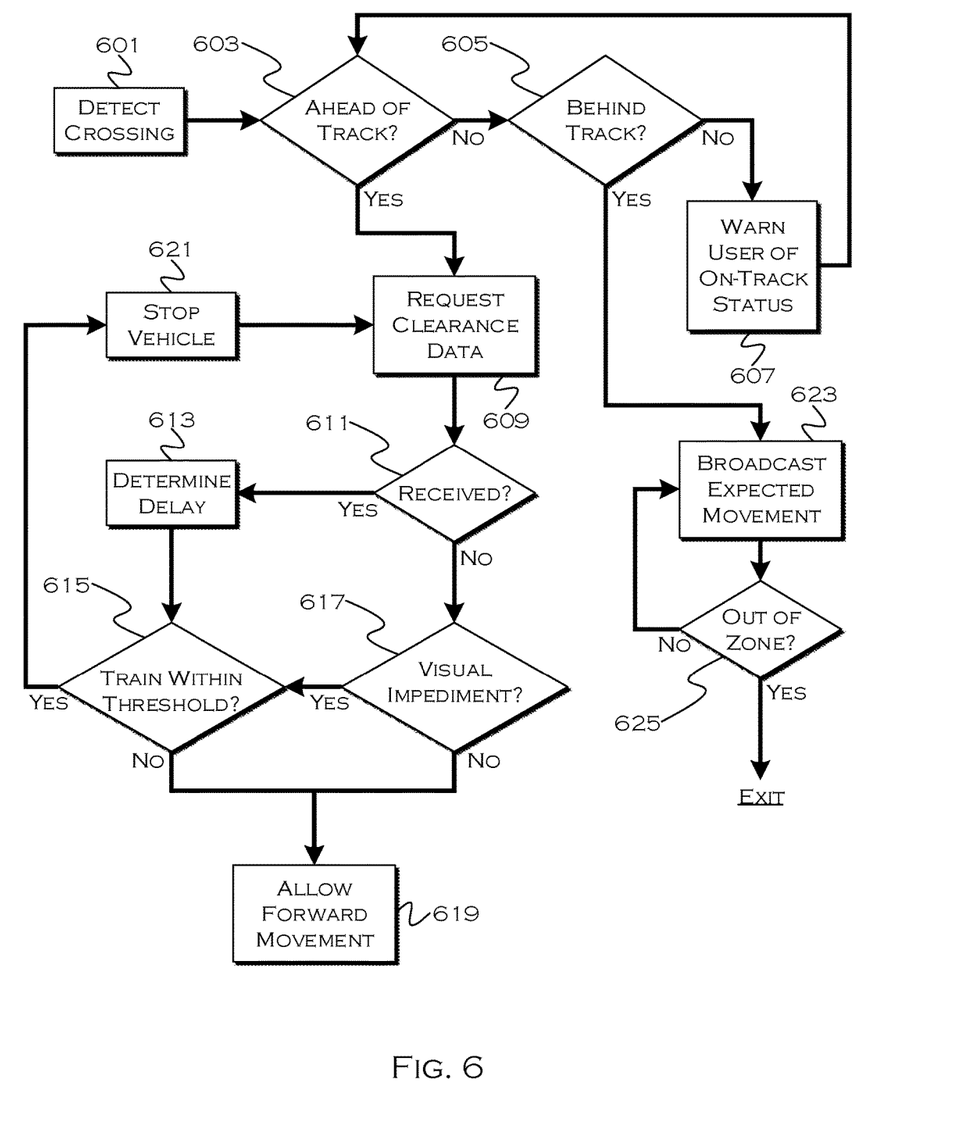
FIG. 6 shows an illustrative process for crossing-proximate information relay and vehicle control.

FIG. 6 shows an illustrative process for crossing-proximate information relay and vehicle control. In this example, the process acts to prevent situations where vehicles will be stopped on train tracks, which can occur whether or not an active state is predicted any time soon. By executing this process even when a train is not present, the user can avoid a situation where a vehicle breaks down or runs out of fuel while on a track, so the process has applicability even if a train is not expected in the immediate future.

When the process determines 601 that a vehicle is within a geo-fence surrounding a crossing, the process determines 603 whether or not the vehicle is ahead 603 of the track (i.e., the track is upcoming) or behind 605 the track (i.e., the vehicle has passed the crossing).

If the vehicle is ahead of the track, the process requests 609 clearance data from other vehicles. Since many vehicles may be broadcasting information about their own relative positions to the track, the process could potentially determine whether there were, for example, vehicles past the track or on the track from this data. This can help prevent a driver from attempting to cross a track, only to discover spillback preventing the driver from actually leaving the track. In that scenario, the likelihood of leaving a vehicle on the tracks increases greatly for each vehicle in line ahead of the vehicle on the tracks, because a breakdown by any one of those vehicles could potentially leave the driver stranded on the track. The delay can therefore be the delay of velocity of the vehicle 1 due to the slow or stopped traffic ahead in the route.

In this example, vehicles behind the track can also broadcast expected movements (based on light timing, clearance ahead, etc.), so that the driver's vehicle could potentially obtain significant information about expected movement of preceding vehicles. If the object vehicle receives 611 clearance data, this data may indicate the amount of time expected before the vehicles behind the track anticipate movement, which can be used by the object vehicle process to determine 613 a likely delay.

For illustration only, in this example, the process determines that if a delay plus a timing threshold is unlikely to result in train arrival 615, the vehicle is allowed to proceed forward. This will not address "leaving" the vehicle on the track for some time, but an alternative example could either tune the threshold to ensure that the vehicle could fully clear the track without waiting before allowing movement. If a train will arrive within a threshold amount of time accommodating expected delay 615, the process may physically stop 621 the vehicle from proceeding.

For example, if a vehicle behind the track indicates that it will likely move within 5 minutes, and the threshold is 10 minutes, then a train 20 minutes away may not cause the vehicle movement-prevention, but a train within 14 minutes may (outside the ten minute threshold, but within the threshold plus expected delay). This version of the process helps maximize traffic movement while still being cautious about trains, the version where the process does not allow the vehicle to proceed unless a vehicle's-worth of clearance exists after the track may slow traffic but prevent vehicles from being stranded on the track. Delay threshold 613 of the vehicle could include a driver-designated value and/or a factory set default.

A secondary consideration in this example, usable when other-vehicle data is not useful or present, or usable when the vehicle only wants to proceed if there is sufficient clearance to cross the track, is to determine 617, via a vehicle camera or sensor, whether or not there is an impediment ahead of the vehicle within a certain distance. In this example, the process tunes the impediment detection to whether or not the vehicle can cross the track, which would be a function of the present location, the distance from the present location to the impediment and the distance from the present location to the track. That is, if a distance from the present location to the track (far side) were more than a vehicle's length from the distance to the impediment, the vehicle can safely fit on the other side of the track, assuming the impediment does not move backwards. Again, forward movement can also hinge on train temporal proximity 615.

If the user is behind (past) the track 605, the process may cause the vehicle to broadcast 623 a location and expected movement time (based on light timing, forward movement of other vehicles, etc.). This broadcast, in this example, only occurs from a finite number of vehicle "behind" the track and within a geographic zone, so there is not a confusing amount of information present about vehicle location and movement. Typically, if more than one data set is available, the vehicles ahead of the track will use a worst-case scenario (which vehicle will move last) to determine if movement should be permitted. The broadcast continues until the vehicle clears 625 the geographic zone of interest.

During this process, if the vehicle is ever within a region placing some portion of the vehicle on or very near to the track, the process may continually 607 warn a user of the on-the-track status of the vehicle. Trains are wider than tracks, so this warning may have a tolerance to either side of the track accommodated thereby. Vehicles including objects such as trailers may make additional accommodation for trailer length when a trailer light is hooked up, for example, typically erring on the side of over-estimating a length if not actually available. The trailer's length could be a pre-programmed parameter by the driver via the display, and could be part of the detect crossing 601 calculation. The trailer attachment could also be automatically detected as part of the vehicle's system to detect trailers, and a default length can be used as set at the factory if there is no driver input.

Figure 7:
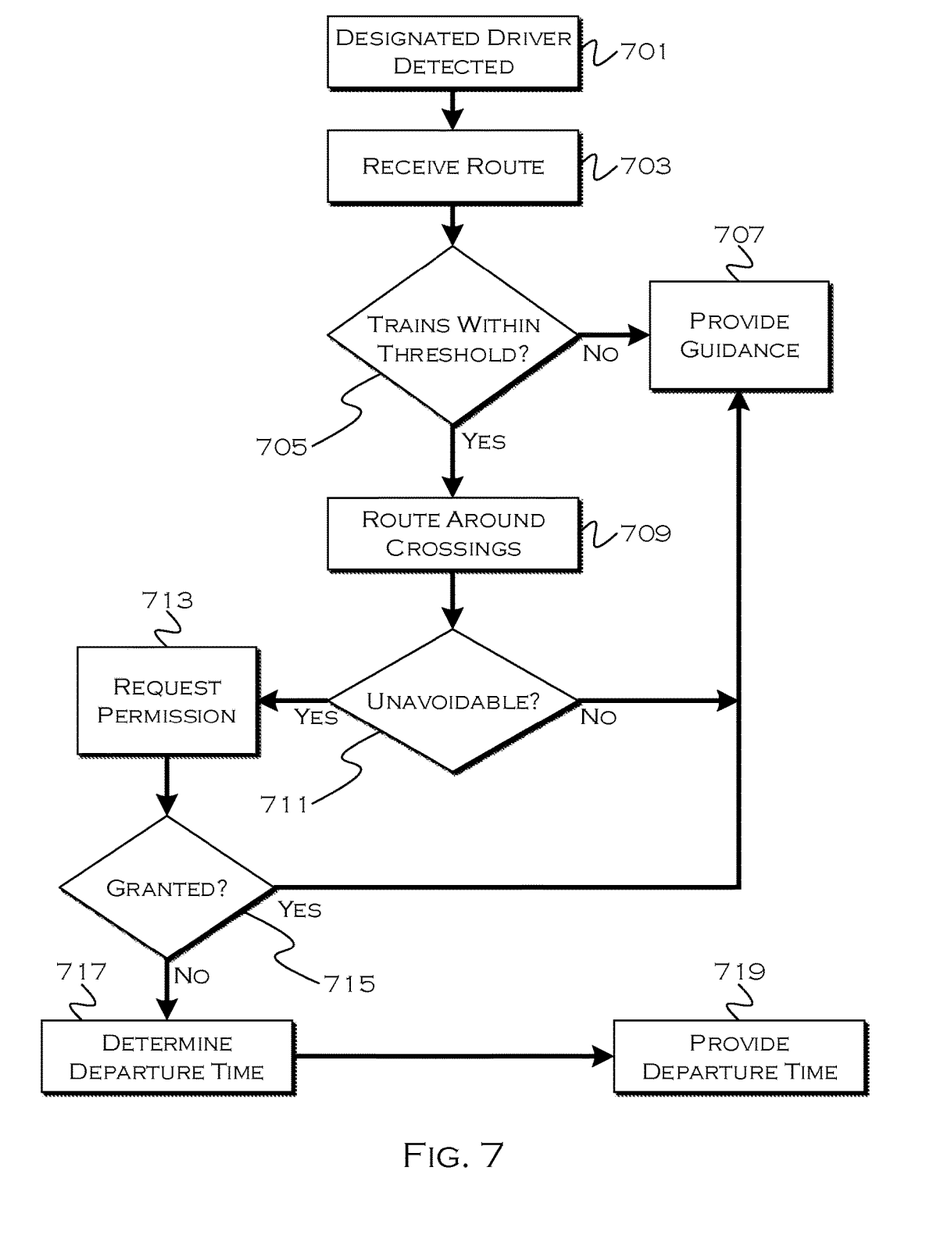
FIG. 7 shows an illustrative process for driver-centric route modification.

FIG. 7 shows an illustrative process for driver-centric route modification. In this example, a parent or guardian may not want certain drivers, prone to poor decisions or slow reactions, traveling over high-risk obstacles such as train crossings at all. In this example, the process can automatically engage rerouting when these risky parties are driving, to hopefully ensure the driver does not even find themselves in a risky scenario to begin with.

If the process detects 701 a driver designated as "risky," or a cargo load or other parameter corresponding to "risky," the process can make a note of this when performing a route calculation. The process can use this designation to avoid potentially dangerous routes, which, in this example, includes avoiding train crossings or, in a less strict example shown, avoiding active train crossings. The process receives 703 an intended destination or route and determines 705 whether there will be any active train crossings along the route at projected arrival times.

If there are no likely active crossings, the process can provide 707 guidance to the driver as with any other route. If there are active crossings, the process attempts 709 to determine a route avoiding the active crossings. As previously noticed, certain crossings may be unavoidable 711 (due to either ridiculous route-around or even no other actual option). If there are no unavoidable active crossings, the process will again provide the route, which now simply avoids active crossings.

If there is an unavoidable active crossing that cannot be addressed by a re-route, the process may request 713 permission from a designated guardian entity. This could include, for example, sending a text message or email, or a message to a phone application. If the guardian approves 715 of the route, the process can provide the route which now includes at least one active crossing.

If the guardian does not approve, the process may determine 717 an alternative departure time that avoids the active nature of any crossings. In this example, the process will provide 719 the alternative departure time, and will not present the route crossing the active crossings. If the user leaves at the newly indicated time, the route presentation should occur, as the route should now avoid any active crossings. More extreme examples could include actually preventing the vehicle from traveling until the later departure time, but in this example the user could travel without the route guidance, the vehicle simply would not act to facilitate the travel. Other active features, such as that in FIG. 6, could still be active to mitigate any potential danger if the driver did encounter an active or passive crossing.

Through use of the illustrative embodiments, drivers can better accommodate train crossings in navigation decision making. Further, even train schedulers can benefit, because they could use the information gathered by the systems described herein to determine ideal times for sending trains (such as when there is commonly low traffic).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
access a train schedule to determine active train crossings along an original route, based on a predicted vehicle-arrival time at a given crossing;
determine that a driver identity has an avoidance parameter associated therewith;
determine a new route avoiding active train crossings, if possible, responsive to the avoidance parameter and determination of at least one active train crossing along the original route; and
engage active train-crossing safety controls when a vehicle approaches within a threshold distance of an active train crossing.

2. The system of claim 1, wherein the active safety controls include automatically braking a vehicle prior to the vehicle entering an active train crossing, and preventing movement until a train has cleared the crossing.

3. The system of claim 1, wherein the active safety controls include automatically braking a vehicle prior to the vehicle entering an active train crossing, and preventing movement until the processor determines existing clearance sufficient to fit the vehicle on a far side of a train crossing.

4. The system of claim 3, wherein the processor is configured to determine existing clearance based on wireless data received from a vehicle on the far side of the train crossing.

5. The system of claim 3, wherein the processor is configured to determine existing clearance based on vehicle sensor data indicating the clearance through lack of detected impediment.

6. A system comprising:
a processor configured to:
determine that a current travel path includes an active train crossing based on expected train presence time;
determine that a vehicle is within a braking threshold distance from the active train crossing; and
automatically brake the vehicle, preventing forward movement of the vehicle until a train has cleared the train crossing, responsive to the vehicle being within the braking threshold distance.

7. The system of claim 6, wherein the braking threshold distance varies based on impediments detected, by a vehicle sensor, between the vehicle and a train crossing location.

8. The system of claim 6, wherein the processor is configured to determine that the train has cleared the train crossing based on a vehicle sensor.

9. The system of claim 6, wherein the processor is configured to determine that the train has cleared the train crossing based on a received wireless indicator that the train has cleared the train crossing.

10. The system of claim 6, wherein the processor is configured to:
determine that the vehicle is within a warning threshold distance from the active train crossing; and
engage a driver warning, responsive to determining that the vehicle is within the warning distance, wherein the warning varies in intensity inversely with vehicle distance from the active train crossing, and wherein the warning persists until the train clears the train crossing.

11. The system of claim 10, wherein the warning diminishes in intensity, including temporarily ceasing, when a vehicle stops moving prior to the train clearing the crossing.

12. A computer-implemented method comprising:
determining, via a vehicle computer or a remote computer in communication with the vehicle computer, that a vehicle is within a threshold distance of an active train crossing, where a train is projected to arrive no later than a threshold time from a present time; and preventing the vehicle from entering a region defining a likely-impact region, responsive to the determining that the vehicle is within the threshold distance, until the vehicle computer determines that the train has cleared the crossing.

* * * * *